Patented May 31, 1949

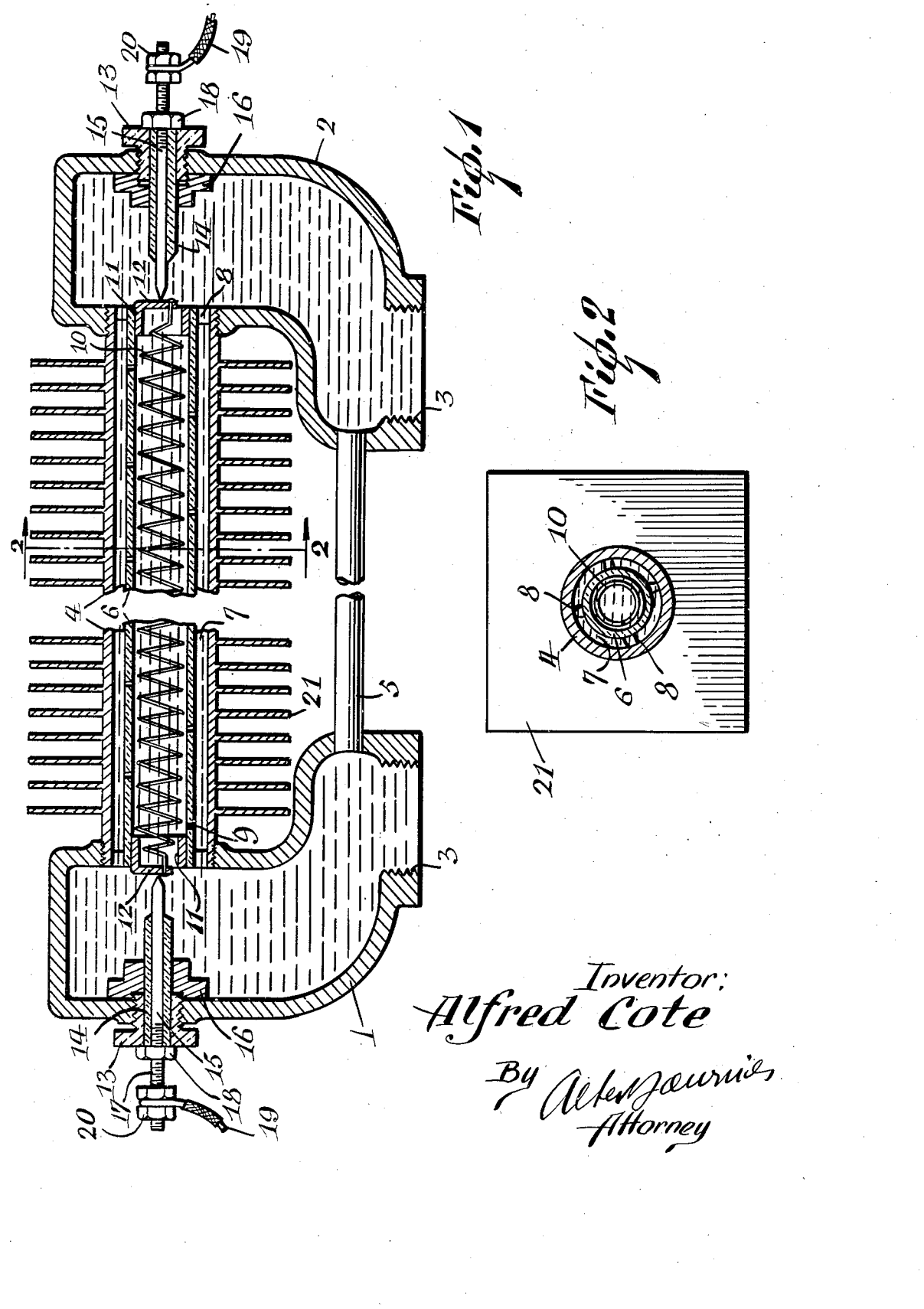

2,471,674

UNITED STATES PATENT OFFICE 2,471,674

ELECTRICAL HEATING UNIT

Alfred Cote, Montreal, Quebec, Canada

Application June 8, 1946, Serial No. 675,350

6 Claims. (Cl. 219—38)

The present invention pertains to a novel electrical space heating unit of the type wherein water is heated by an electric element.

The principal object of the invention is to provide a simple and inexpensive unit of this character.

Another object of the invention is to provide such an apparatus that lends itself to easy installation in some existing non-electrical installations.

In the accomplishment of this object, the invention embodies water supply and return headers spaced apart and having suitable water connections thereto. The headers are joined by a main water pipe in which the water is heated electrically. The pipe carries external fins of suitable size and number, and the entire unit is finally enclosed in a housing to provide a finished and agreeable appearance. The headers are further connected by a by-pass below the aforementioned water pipe, in order to provide sufficient circulation of water within the unit.

The electrical apparatus includes an insulated tube mounted spacedly within the water pipe and having flow apertures through its wall. In the ends of this tube are fitted conducting bushings having inwardly extending tongues to which are connected the ends of an electrical element contained within the tube. In the end walls of the headers, opposite the tongues are mounted electrical terminal connections with contacts extending therefrom into engagement with the respective tongues. Each terminal embodies an insulating sleeve supporting a stem which is the conducting member to and from the corresponding tongue. The sleeves are held by lock nuts which also serve as packings. The electrical conductors are connected to the stems.

The invention is fully disclosed by way of example in the following description and in the accompanying drawings in which:

Figure 1 is a longitudinal section of the device; and

Figure 2 is a section on the line 2—2 of Figure 1.

Reference to these views will now be made by use of like characters which are employed to designate corresponding parts throughout.

In Figure 1 are shown a supply header 1 and a similar return header 2 which appear at the ends of the installation when viewed in front elevation or longitudinal section. The lower ends of the headers are formed with tapped holes 3 for connection of the supply and return water pipes, respectively.

The upper portions of the headers are joined by a horizontal pipe 4, and the lower portions are joined by a smaller by-pass pipe 5, thereby providing a complete water circuit. In the cross pipe 4 is mounted a porcelain or other insulated tube 6 which forms an annular water passage 7. The tube 6 is held in this spaced relation by lugs 8 on the ends thereof and engaging the inner wall of the pipe 4. The wall of the tube 6 is formed with apertures 9 to permit flow of water between the passage 7 and the interior of the tube.

A coiled resistance element 10 is supported within the tube 6 by means of bushings 11 fitted in the ends of the latter. The bushings are formed respectively with inwardly directed tongues 12 to which the ends of the resistance elements are attached.

In the outer ends of the headers 1 and 2 are fitted nuts 13 which in turn receive porcelain or other insulated sleeves 14 extending some distance into the headers. The members 14 serve to support contact stems 15 which are adjusted into engagement with the tongues 12 and so held by lock nuts 16 screwed on the inner ends of the insulated nuts 13. The nuts 13 and 16 fit tightly on the corresponding sleeve 14 and thus serve as packings.

The outer ends of the stems 15 are threaded at 17 to receive smaller lock nuts 18 bearing against the outer ends of the sleeves 14. Each threaded end 17 also supports the bare end of a conductor 19, secured by a pair of binding nuts 20.

The pipe 14 is formed with a number of suitably shaped external radiating fins 21. The unit is finally enclosed in a suitable housing (not shown) to provide a finished and agreeable appearance. The invention is applicable to existing non-electrical water heaters by installing the insulated tube 6, the element 10 and the contact assemblies at the ends. It is evident also that the device may be furnished as a complete new unit.

As the element is heated, hot water is discharged through the upper apertures 9 and replenished through the lower apertures.

Although a specific embodiment of the invention has been illustrated and described, it will be understood that various alterations in the details of construction may be made without departing from the scope of the invention as indicated by the appended claims.

What I claim as my invention is:

1. An electrical heating unit comprising a pair of horizontally spaced water headers, a horizontal cross pipe connecting said headers, an insulated tube mounted spacedly in said pipe and having apertures through its wall, an electric heating element in said tube, and contact means mounted in said headers and engaging the ends of said element.

2. An electrical heating unit comprising a pair of horizontally spaced water headers, a horizontal cross pipe connecting said headers, an insulated tube mounted spacedly in said pipe and having apertures through its wall, an electric heating element in said tube, conducting bushings fitted in the ends of said tube and having each an inwardly directed tongue, said tongues being connected to the ends of said element, and contact means mounted in said headers and engaging said tongues.

3. An electrical heating unit comprising a pair of horizontally spaced water headers, a horizontal cross pipe connecting said headers, an insulated tube mounted spacedly in said pipe and having apertures through its wall, an electric heating element in said tube, insulated sleeves mounted in said headers opposite the ends of said element, contact stems mounted respectively in said sleeves and engaging the ends of said element.

4. An electrical heating unit comprising a pair of horizontally spaced water headers, a horizontal cross pipe connecting said headers, an insulated tube mounted spacedly in said pipe and having apertures through its wall, an electric heating element in said tube, conducting bushings fitted in the ends of said tube and having each an inwardly directed tongue, said tongues being connected to the ends of said element, insulated sleeves mounted in said headers opposite the ends of said element, and contact stems mounted respectively in said sleeves and engaging said tongues.

5. An electrical heating unit comprising a pair of horizontally spaced water headers, a horizontal cross pipe connecting said headers, an insulated tube mounted spacedly in said pipe and having apertures through its wall, a by-pass connecting said headers below said pipe, an electric heating element in said tube, and contact means mounted in said headers and engaging the ends of said element.

6. An electrical heating unit comprising a pair of horizontally spaced water headers, a horizontal cross pipe connecting said headers, an insulated tube mounted spacedly in said pipe and having apertures through its wall, a by-pass connecting said headers below said pipe, an electric heating element in said tube, conducting bushings fitted in the ends of said tube and having each an inwardly directed tongue, said tongues being connected to the ends of said element, and contact means mounted in said headers and engaging said tongues.

ALFRED COTE.

REFERENCES CITED

The following references are of record in the file of this patent:

UNITED STATES PATENTS

| Number | Name | Date |
| --- | --- | --- |
| 1,174,714 | Harrison et al. | Mar. 7, 1916 |
| 1,921,047 | Sword | Aug. 8, 1933 |
| 2,000,438 | Dougherty | May 7, 1935 |
| 2,041,653 | Cornell, Jr. | May 19, 1936 |